United States Patent
Obayashi et al.

(10) Patent No.: US 10,864,882 B2
(45) Date of Patent: Dec. 15, 2020

(54) AIRBAG APPARATUS

(71) Applicant: HONDA MOTOR CO., LTD., Tokyo (JP)

(72) Inventors: Yuya Obayashi, Wako (JP); Seiji Kobata, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 16/203,736

(22) Filed: Nov. 29, 2018

(65) Prior Publication Data

US 2019/0202394 A1 Jul. 4, 2019

(30) Foreign Application Priority Data

Dec. 28, 2017 (JP) .................................. 2017-254246

(51) Int. Cl.
*B60R 21/231* (2011.01)
*B60R 21/213* (2011.01)
(Continued)

(52) U.S. Cl.
CPC ...... *B60R 21/23138* (2013.01); *B60R 21/205* (2013.01); *B60R 21/213* (2013.01); *B60R 21/214* (2013.01); *B60R 21/232* (2013.01); *B60R 21/233* (2013.01); *B60R 21/2334* (2013.01); *B60R 2021/0004* (2013.01);
(Continued)

(58) Field of Classification Search
CPC ... B60R 21/213; B60R 21/214; B60R 21/232; B60R 21/233; B60R 21/2334; B60R 2021/23308; B60R 2021/0048; B60R 2021/161; B60R 2021/0004
See application file for complete search history.

(56) References Cited

U.S. PATENT DOCUMENTS

| 8,807,593 B2 * | 8/2014 | Lee ..................... B60R 21/213 280/730.1 |
| 2005/0023806 A1 * | 2/2005 | Higuchi ............. B60R 21/2338 280/730.1 |

(Continued)

FOREIGN PATENT DOCUMENTS

| DE | 19859988 | 6/2000 |
| DE | 102018102053 | 8/2018 |

(Continued)

OTHER PUBLICATIONS

Japanese Office Action for Japanese Patent Application No. 2017-254246 dated Jul. 2, 2019.

(Continued)

*Primary Examiner* — Karen Beck
(74) *Attorney, Agent, or Firm* — Amin, Turocy & Watson, LLP

(57) ABSTRACT

An airbag apparatus includes an airbag's bag body that inflates to be spread such that a front side and both sides of an occupant are surrounded. The airbag's bag body includes a first bag body, a second bag body, and a third bag body which are integrally formed. In a state in which the first bag body, the second bag body, and the third bag body have inflated to be spread, a lower portion of each of the bag bodies is disposed to be further attracted to the occupant side than an upper portion.

7 Claims, 8 Drawing Sheets

(51) Int. Cl.
*B60R 21/205* (2011.01)
*B60R 21/233* (2006.01)
*B60R 21/2334* (2011.01)
*B60R 21/214* (2011.01)
*B60R 21/232* (2011.01)
*B60R 21/00* (2006.01)
*B60R 21/16* (2006.01)

(52) U.S. Cl.
CPC ............ *B60R 2021/0006* (2013.01); *B60R 2021/0048* (2013.01); *B60R 2021/161* (2013.01); *B60R 2021/23107* (2013.01); *B60R 2021/23308* (2013.01)

(56) References Cited

U.S. PATENT DOCUMENTS

| | | | |
|---|---|---|---|
| 2012/0032427 A1* | 2/2012 | Ochiai | B60R 21/232 280/730.2 |
| 2016/0311393 A1* | 10/2016 | Smith | B60R 21/232 |
| 2017/0057456 A1 | 3/2017 | Ohno et al. | |
| 2018/0215338 A1 | 8/2018 | Faruque et al. | |
| 2019/0202394 A1* | 7/2019 | Obayashi | B60R 21/232 |
| 2020/0017059 A1* | 1/2020 | Choi | B60R 21/23138 |

FOREIGN PATENT DOCUMENTS

| | | |
|---|---|---|
| EP | 2699454 | 11/2017 |
| JP | 2002-321583 | 11/2002 |
| JP | 2003-182502 | 7/2003 |
| JP | 2003-200809 | 7/2003 |
| JP | 2005-001412 | 1/2005 |
| JP | 2006-327419 | 12/2006 |
| JP | 2007186156 A * | 7/2007 |
| JP | 2008-284904 | 11/2008 |
| JP | 2013-082418 | 5/2013 |
| JP | 2014-237382 | 12/2014 |
| JP | 2016-180220 | 10/2016 |
| JP | 2016-222072 | 12/2016 |
| WO | 2012/144748 | 10/2012 |

OTHER PUBLICATIONS

German Search Report for German Patent Application No. 102018221842.0 dated Jul. 31, 2019.

* cited by examiner

AIRBAG APPARATUS

CROSS-REFERENCE TO RELATED APPLICATION

Priority is claimed on Japanese Patent Application No. 2017-254246, filed Dec. 28, 2017, the content of which is incorporated herein by reference.

BACKGROUND OF THE INVENTION

Field of the Invention

The present invention relates to an airbag apparatus.

Description of Related Art

For example, airbag apparatuses, in which a front airbag inflates to be spread on a front side of a vehicle body with respect to occupants sitting on a seat for a driver and a seat for a passenger and side airbags inflate to be spread on outer sides in a vehicle width direction with respect to the occupants in the seats, are known. These airbag apparatuses are formed in a U-shape in a manner of covering occupants in the seat for a driver and the seat for a passenger with the front airbag and the side airbags on both sides.

The front airbag inflates to be spread in an inclined shape on a downward gradient toward the occupant side from an upper end to a lower end. Thus, occupants in the seat for a driver and the seat for a passenger can be protected by restraining the occupants from moving to the front side of the vehicle body with the front airbag. In addition, the side airbags inflate to be spread vertically from the upper end to the lower end. Thus, occupants in the seat for a driver and the seat for a passenger can be protected by restraining the occupants from moving outward in the vehicle width direction with the side airbags (for example, refer to Japanese Unexamined Patent Application, First Publication No. 2008-284904 (hereinafter, Patent Document 1)).

SUMMARY OF THE INVENTION

However, an airbag apparatus of Patent Document 1 is formed in a U-shape in a manner of covering occupants in both a seat for a driver and a seat for a passenger, in a state in which a front airbag and side airbags on both sides have inflated to be spread. Thus, it is difficult to suitably restrain each of occupants in the seat for a driver and the seat for a passenger inward in a vehicle width direction. Therefore, it is difficult to suitably restrain occupants in all directions to a front side of a vehicle body, an outer side in the vehicle width direction, and an inner side in the vehicle width direction.

In addition, the airbag apparatus of Patent Document 1 inflates to be spread vertically from an upper end to a lower end in a state in which the side airbags on both sides have inflated to be spread. Therefore, it is difficult to suitably ensure restraining of occupants in the seat for a driver and the seat for a passenger outward in the vehicle width direction.

An aspect of the present invention has been made in consideration of the foregoing circumstances, and an object thereof is to provide an airbag apparatus in which an occupant can be suitably restrained in all directions to a front side of a vehicle body, an outer side in a vehicle width direction, and an inner side in the vehicle width direction.

In order to solve the problems described above and to achieve the object thereof, the present invention employs the following aspect.

(1) According to an aspect of the present invention, there is provided an airbag apparatus including an airbag's bag body that inflates to be spread such that a front side and both sides of an occupant are surrounded. The airbag's bag body includes a first bag body, a second bag body, and a third bag body which are integrally formed. In a state in which the first bag body, the second bag body, and the third bag body have inflated to be spread, a lower portion of each of the bag bodies is disposed to be further attracted to the occupant side than an upper portion.

In this manner, in a state in which the first bag body, the second bag body, and the third bag body have inflated to be spread, the front side and both sides of an occupant are surrounded with each of the bag bodies, and a lower end (the lower portion) of each of the bag bodies can be attracted to the occupant side. That is, the first bag body, the second bag body, and the third bag body inflate to be spread in an inclined shape in a manner of approaching an occupant from the upper portion toward the lower portion.

Accordingly, an occupant can be suitably restrained by each of the bag bodies (particularly, the lower portion of each of the bag bodies) in all directions including forward in a vehicle body, outward in a vehicle width direction, and inward in the vehicle width direction with respect to the occupant. As a result, an occupant can be appropriately protected in all directions.

(2) In (1) described above, in the state in which the first bag body, the second bag body, and the third bag body have inflated to be spread, a top side on which upper ends of the bag bodies are connected to each other may be formed to have a length dimension larger than a length dimension of a bottom side on which lower ends of the bag bodies are connected to each other.

In this manner, the top side on which the upper ends of the first bag body, the second bag body, and the third bag body are connected to each other is formed to have a length dimension larger than the length dimension of the bottom side on which lower ends of the bag bodies are connected to each other. In other words, the lower ends of the first bag body, the second bag body, and the third bag body are formed to have a length dimension smaller than the length dimension of the upper ends. Thus, in a state in which each of the bag bodies inflates to be spread such that the front side and both sides of an occupant are surrounded, the lower end (that is, the lower portion) of each of the bag bodies can be attracted to the occupant side. That is, the first bag body, the second bag body, and the third bag body can be caused to inflate to be spread in an inclined shape in a manner of approaching an occupant from the upper portion toward the lower portion.

Accordingly, an occupant can be suitably restrained by each of the bag bodies (particularly, the lower portion of each of the bag bodies) in all directions including forward in the vehicle body, outward in the vehicle width direction, and inward in the vehicle width direction with respect to the occupant. As a result, an occupant can be appropriately protected in all directions.

(3) (1) or (2) described above may further include an inflator that injects gas into the first bag body, the second bag body, and the third bag body. The inflator may be attached to the upper end of the first bag body, and a gas flow channel may be formed in each of the bag bodies. The gas flow channel may be formed downward to the second bag body from the first bag body, may be formed in the lower portion of the second bag body, and may be formed upward to the third bag body from the lower portion of the second bag body.

In this manner, the gas flow channel is formed downward to the second bag body from the first bag body. In addition, the gas flow channel extending in the second bag body is formed along the lower portion of the second bag body. Moreover, the gas flow channel extending along the lower portion of the second bag body is formed upward to the third bag body from the lower portion of the second bag body.

Thus, the gas flow channel can be continuously constituted of one flow channel from the first bag body to the third bag body via the second bag body. That is, one gas flow channel can be continuously constituted from an end portion of the airbag's bag body on the inflator side to an end portion of the inflator on the opposite side. Accordingly, when the continuous flow channel is filled with gas, a tensile force for attracting the lower end of the airbag's bag body to an inner side (that is, the occupant side) can be generated by the flow channel filled with gas.

As a result, an occupant can be suitably restrained by each of the bag bodies (particularly, the lower portion of each of the bag bodies) in all directions including forward in the vehicle body, outward in the vehicle width direction, and inward in the vehicle width direction with respect to the occupant.

(4) (1) described above may further include a first gas flow channel that is formed in the lower portion of the second bag body, and a second gas flow channel that is formed in the upper portion of the second bag body. The first flow channel may be formed to be a flow channel having a cross-sectional area larger than a cross-sectional area of the second flow channel.

In this manner, the first flow channel is formed in the lower portion of the second bag body, and the first flow channel is formed to be a flow channel having a large cross-sectional area. Thus, when the first flow channel is filled with gas, the lower portion of the second bag body significantly inflates in a width direction due to the inflated first flow channel. Accordingly, the lower portion of the second bag body is contracted in a length direction. Therefore, in a state in which the first bag body, the second bag body, and the third bag body have inflated to be spread such that the front side and both sides of an occupant are surrounded, the lower end (that is, the lower portion) of each of the bag bodies can be attracted to the occupant side.

That is, the first bag body, the second bag body, and the third bag body can be caused to inflate to be spread in an inclined shape in a manner of approaching an occupant from the upper portion toward the lower portion.

Accordingly, an occupant can be suitably restrained by each of the bag bodies (particularly, the lower portion of each of the bag bodies) in all directions including forward in the vehicle body, outward in the vehicle width direction, and inward in the vehicle width direction with respect to the occupant. As a result, an occupant can be appropriately protected in all directions.

(5) In (4) described above, the upper portion of the second flow channel may have a tapered shape.

Here, the upper portion of the second flow channel is formed in the upper portion of the second bag body. In addition, the upper portion of the second flow channel is formed in a tapered shape. Thus, in a state in which the second flow channel is filled with gas, it is possible to minimize inflation of the upper portion of the second bag body in the width direction due to the inflated second flow channel. Accordingly, the upper portion of the second bag body can be inhibited from being contracted in the length direction.

Therefore, in a state in which the first bag body, the second bag body, and the third bag body have inflated to be spread such that the front side and both sides of an occupant are surrounded, the lower end (that is, the lower portion) of each of the bag bodies can be attracted to the occupant side.

Accordingly, an occupant can be suitably restrained by each of the bag bodies (particularly, the lower portion of each of the bag bodies) in all directions including forward in the vehicle body, outward in the vehicle width direction, and inward in the vehicle width direction with respect to the occupant.

(6) In any one of (1) to (5) described above, an end portion of the gas flow channel formed in the third bag body may have a closed structure.

In this manner, when the end portion of the gas flow channel formed in the third bag body has a closed structure, gas supplied from the inflator can be prevented from being discharged out of the airbag's bag body. Thus, the supplying amount of gas supplied from the inflator to the inside of the airbag's bag body can be minimized. Accordingly, the shape of the inflator is minimized, and reduction in costs and weight reduction in an airbag apparatus can be realized.

According to the aspect of the present invention, in a state in which the first bag body, the second bag body, and the third bag body have inflated to be spread, the front side and both sides of an occupant are surrounded with each of the bag bodies, and the lower end (the lower portion) of each of the bag bodies can be attracted to the occupant side. Accordingly, an occupant can be suitably restrained in all directions to the front side of the vehicle body, the outer side in the vehicle width direction, and the inner side in the vehicle width direction.

DETAILED DESCRIPTION OF THE INVENTION

Figure 1:
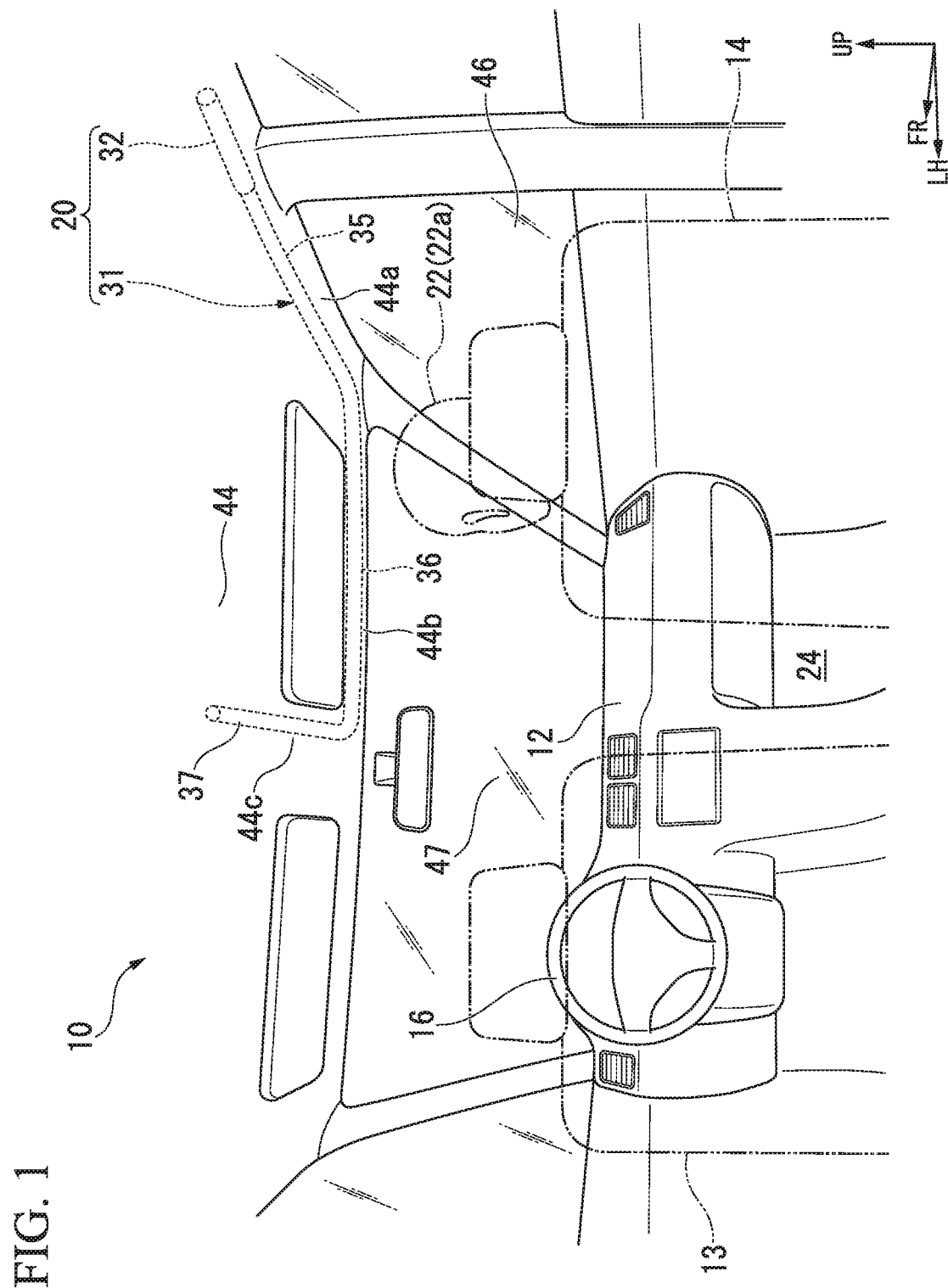
FIG. 1 is a perspective view illustrating a vehicle in which an airbag apparatus according to a first embodiment of the present invention is housed.

Embodiments of the present invention will be described on the basis of the drawings. In the drawings, an arrow FR is directed to the front side of a vehicle, an arrow UP is directed to the upper side of the vehicle, and an arrow LH is directed to the left side of the vehicle. In addition, in the embodiments, for example, a vehicle 10, in which a driver's seat 13 (a seat for a driver) is disposed on the left side of the vehicle, and a passenger seat 14 (a seat for a passenger) is disposed on the right side of the vehicle, will be described.

First Embodiment

As illustrated in FIG. 1, the vehicle 10 includes an instrument panel 12, the driver's seat 13, the passenger seat 14, a steering wheel 16, and an airbag apparatus 20.

In the embodiment, the airbag apparatus 20 which restrains and protects an upper half 22a of the body of an occupant 22 sitting on the passenger seat 14 will be described as a representative example.

The instrument panel 12 is provided on the front side of a vehicle body in a vehicle interior 24. The driver's seat 13 and the passenger seat 14 are provided on the rear side of the vehicle body from the instrument panel 12. The steering wheel 16 is provided on the front side of the vehicle body from the driver's seat 13. A driver sits on the driver's seat 13. A passenger (who will hereinafter be referred to as an occupant) 22 sits on the passenger seat 14.

The airbag apparatus 20 includes an airbag's bag body 31 and an inflator 32.

Figure 3:
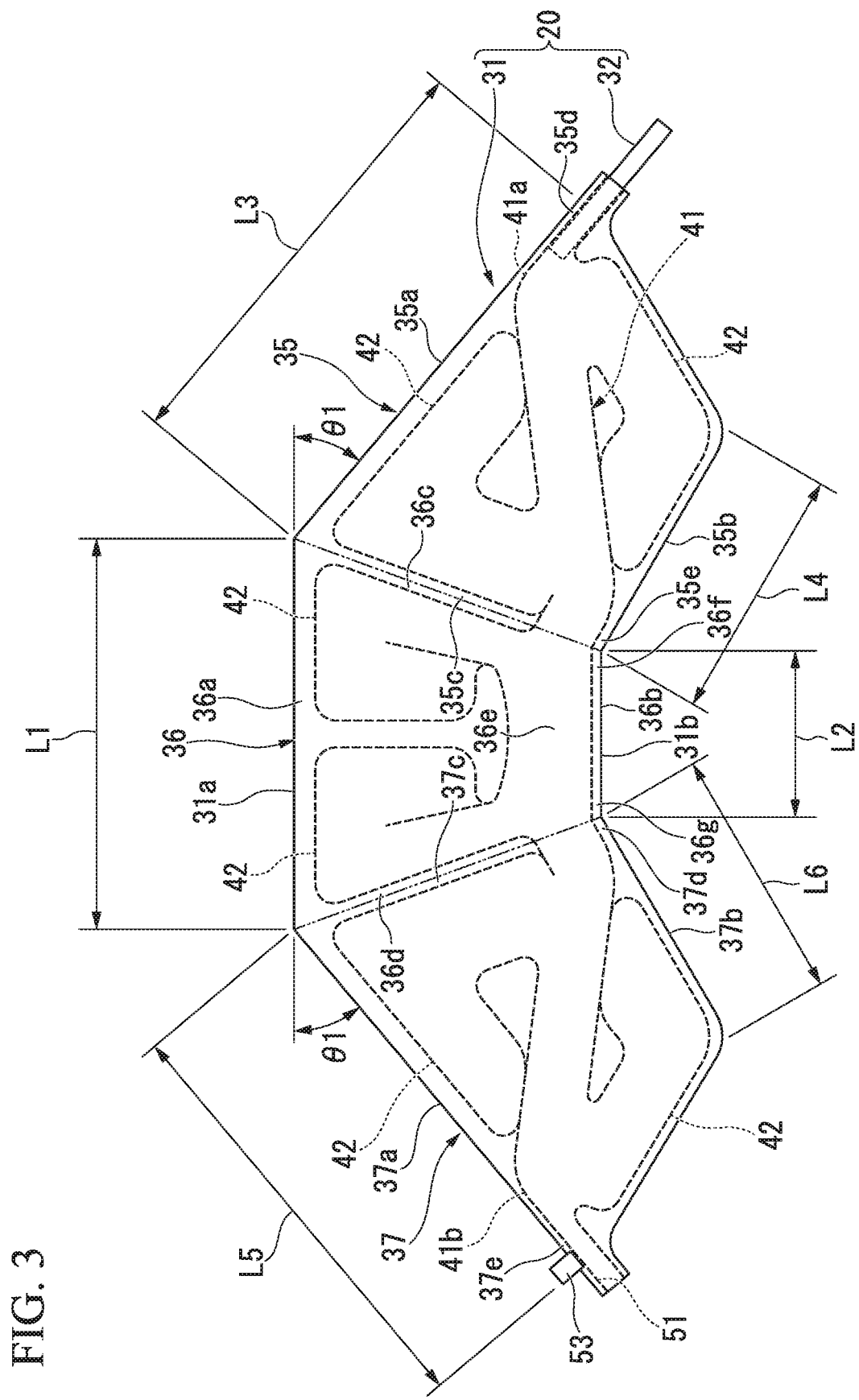
FIG. 3 is a plan view illustrating an airbag's bag body according to the first embodiment of the present invention.

The airbag's bag body 31 includes a first bag body 35, a second bag body 36, a third bag body 37, a first flow channel 41 (refer to FIG. 3), and a plurality of second flow channels 42 (refer to FIG. 3).

The first bag body 35, the second bag body 36, and the third bag body 37 are folded in an accommodated state and are housed (mounted) above a head lining 44 of the vehicle 10.

The airbag's bag body 31 is formed in a U-shape in a state in which the first bag body 35, the second bag body 36, and the third bag body 37 are folded in an accommodated state.

Here, for example, the first bag body 35 is housed above a right side portion 44a of the head lining 44 along a roof rail. In addition, for example, the second bag body 36 is housed above a front end portion 44b of the head lining 44 along a front roof member. Moreover, for example, the third bag body 37 is housed above a middle 44c of the head lining 44 in a vehicle width direction along a middle roof rail.

Figure 2:
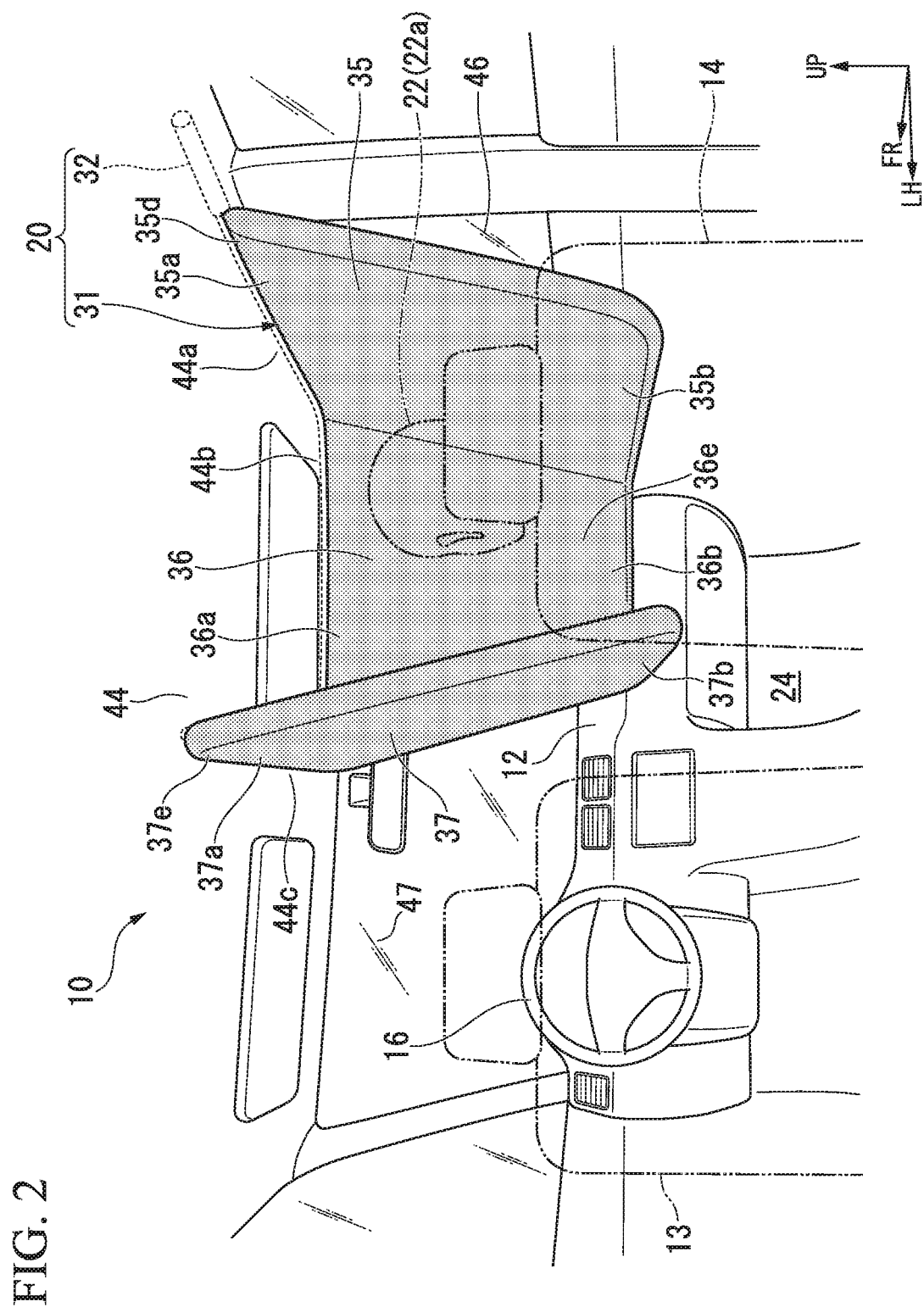
FIG. 2 is a perspective view illustrating a vehicle in which the airbag apparatus according to the first embodiment of the present invention inflates to be spread.

As illustrated in FIG. 2, in the airbag apparatus 20, when an impact load is input to the vehicle 10, gas is injected into the airbag's bag body 31 from the inflator 32, and the airbag's bag body 31 inflates to be spread. The airbag's bag body 31 inflates to be spread downward in the vehicle interior 24 by tearing the head lining 44 due to the pressure when it inflates, or rolling the head lining 44.

For example, an airproof and soft material such as nylon woven fabric is used for the airbag's bag body 31, which is formed in a bag shape using polyamide yarn or the like. In addition, it is preferable that an inner surface of the airbag's bag body 31 be coated with rubber, silicon, or the like having heat resistant properties.

An upper end 35a of the first bag body 35 of the airbag's bag body 31 is disposed along the roof rail on the right side, so that the first bag body 35 inflates to be spread downward on the inner side of a right side window glass 46 in the vehicle width direction. In this state, the first bag body 35 is disposed on the right side (one side) of the upper half 22a of the body of the occupant 22 in the vehicle width direction.

In addition, an upper end 36a of the second bag body 36 is disposed along the front roof member, so that the second bag body 36 inflates to be spread downward on the inner side of a windshield 47 in the vehicle width direction. In this state, the second bag body 36 is disposed on the front side of the vehicle body (the front) from the upper half 22a of the body of the occupant 22.

Moreover, an upper end 37a of the third bag body 37 is disposed along the middle roof rail, so that the third bag body 37 inflates to be spread downward in the middle in the vehicle width direction. In this state, the third bag body 37 is disposed on the left side (the other side) of the upper half 22a of the body of the occupant 22 in the vehicle width direction.

Accordingly, the airbag's bag body 31 inflates to be spread such that the front side and both sides of the upper half 22a of the body of the occupant 22 are surrounded. The "front side and both sides of the upper half 22a of the body of the occupant 22" will be referred to as "all directions with respect to the upper half 22a of the body of the occupant 22".

Hereinafter, the configuration of the airbag's bag body 31 will be described in detail on the basis of FIGS. 2 and 3. FIG. 3 illustrates a spread state of the airbag's bag body 31 that has inflated to be spread in a plan view.

As illustrated in FIGS. 2 and 3, in a state of having inflated to be spread, the second bag body 36 is disposed on the front side of the vehicle body from the upper half 22a of the body of the occupant 22 and is formed in a trapezoidal shape such that a length dimension L2 of a lower end 36b is smaller than a length dimension L1 of the upper end 36a.

A front end 35c of the first bag body 35 is integrally formed with a right end 36c of the second bag body 36. The first bag body 35 is disposed on the right side of the upper half 22a of the body of the occupant 22 in the vehicle width direction, and the upper end 35a is inclined on a downward gradient at an angle θ1 with respect to the upper end 36a of the second bag body 36. The first bag body 35 is formed in a trapezoidal shape such that a length dimension L4 of a lower end 35b is smaller than a length dimension L3 of the upper end 35a.

The inflator 32 is attached to an upper rear corner portion (an upper end of the first bag body) 35d in the upper end 35a of the first bag body 35. For example, the inflator 32 is attached to the roof rail on the right side (that is, the vehicle body).

A front end 37c of the third bag body 37 is integrally formed with a left end 36d of the second bag body 36. The third bag body 37 is formed to have substantially bilateral symmetry with the first bag body 35. That is, the third bag body 37 is disposed on the left side of the upper half 22a of the body of the occupant 22 in the vehicle width direction, and the upper end 35a is inclined on a downward gradient at the angle θ1 with respect to the upper end 36a of the second bag body 36. The third bag body 37 is formed in a trapezoidal shape such that a length dimension L6 of a lower end 37b is smaller than a length dimension L5 of the upper end 37a.

The upper end 35a of the first bag body 35, the upper end 36a of the second bag body 36, and the upper end 37a of the third bag body 37 are connected and form a top side 31a of the airbag's bag body 31. In addition, the lower end 35b of the first bag body 35, the lower end 36b of the second bag body 36, and the lower end 37b of the third bag body 37 are connected and form a bottom side 31b of the airbag's bag body 31.

The top side 31a of the airbag's bag body 31 is formed to have a length dimension larger than that of the bottom side 31b of the airbag's bag body 31.

The airbag's bag body 31 includes the first flow channel (the gas flow channel) 41 and the plurality of second flow channels 42. The first flow channel 41 is formed in each of the bag bodies 35 to 37 in a manner of linearly extending to the third bag body 37 from the first bag body 35 through the second bag body 36.

Specifically, a part of the first flow channel 41 on the right side diagonally extends downward to a lower front corner portion 35e of the first bag body 35 from the upper rear corner portion 35d of the first bag body 35. In other words, a part of the first flow channel 41 on the right side is formed downward to the second bag body 36 from the first bag body 35.

In addition, the middle part of the first flow channel 41 linearly extends to a lower front corner portion 37d of the third bag body 37 from the lower front corner portion 35e of the first bag body 35 along the lower end 36b of the second bag body 36. In other words, the middle part of the first flow channel 41 is formed in a lower portion 36e of the second bag body 36.

Moreover, a part of the first flow channel 41 on the left side diagonally extends upward to an upper rear corner portion 37e of the third bag body 37 from the lower front corner portion 37d of the third bag body 37. In other words, a part of the first flow channel 41 on the left side is formed upward to the third bag body 37 from the lower portion 36e of the second bag body 36.

Here, in a spread state of the airbag's bag body 31 that has inflated to be spread in a plan view, the first flow channel 41 linearly extends to the upper rear corner portion 37e of the third bag body 37 from the upper rear corner portion 35d of the first bag body 35 through the lower end 36b of the second bag body 36.

The inflator 32 is attached to the upper rear corner portion 35d of the first bag body 35. Thus, the upper rear corner portion 35d of the first bag body 35 is attached to the roof rail on the right side (that is, the vehicle body) via the inflator 32.

In addition, an opening portion 51 of the first flow channel 41 is formed in the upper rear corner portion 37e of the third bag body 37. Moreover, the upper rear corner portion 37e of the third bag body 37 is attached to the vehicle body via an attachment portion 53.

Moreover, in a spread state of the airbag's bag body 31 that has inflated to be spread in a plan view, the first flow channel 41 linearly extends to the upper rear corner portion 37e of the third bag body 37 from the upper rear corner portion 35d of the first bag body 35 through the lower end 36b of the second bag body 36.

Thus, a leading end portion 41a of the first flow channel 41 is coupled to the roof rail on the right side (that is, the vehicle body) via the upper rear corner portion 35d of the first bag body 35. In addition, a trailing end portion 41b of the first flow channel 41 is coupled to the vehicle body via the upper rear corner portion 37e of the third bag body 37.

In addition, the plurality of second flow channels 42 communicate with the first flow channel 41 in the first to third bag bodies 35 to 37. That is, in the first bag body 35, the second flow channel 42 is provided on the upper side and the lower side of the first flow channel 41. The second flow channel 42 on the upper side communicates with the first flow channel 41 in the lower front corner portion 35e of the first bag body 35. The second flow channel 42 on the lower side communicates with the first flow channel 41 in the upper rear corner portion 35d of the first bag body 35.

In addition, in the second bag body 36, a pair of second flow channels 42 is provided on the upper side of the first flow channel 41. The second flow channel 42 on the right side communicates with the first flow channel 41 in a lower right corner portion 36f of the second bag body 36. The second flow channel 42 on the left side communicates with the first flow channel 41 in a lower left corner portion 36g of the second bag body 36.

Moreover, in the third bag body 37, the second flow channel 42 is provided on the upper side and the lower side of the first flow channel 41. The second flow channel 42 on the upper side communicates with the first flow channel 41 in the lower front corner portion 37d of the third bag body 37. The second flow channel 42 on the lower side communicates with the first flow channel 41 in the upper rear corner portion 37e of the third bag body 37.

Gas is injected into the first flow channel 41 and the plurality of second flow channels 42 from the inflator 32. Thus, gas is supplied to (fills) the entire region of the first bag body 35, the second bag body 36, and the third bag body 37. Accordingly, the airbag's bag body 31 can be caused to inflate to be spread throughout the entire region.

Next, an example of restraining and protecting the upper half 22a of the body of the occupant 22 by causing the airbag's bag body 31 of the airbag apparatus 20 to inflate to be spread will be described on the basis of FIGS. 2 and 4.

Figure 4:
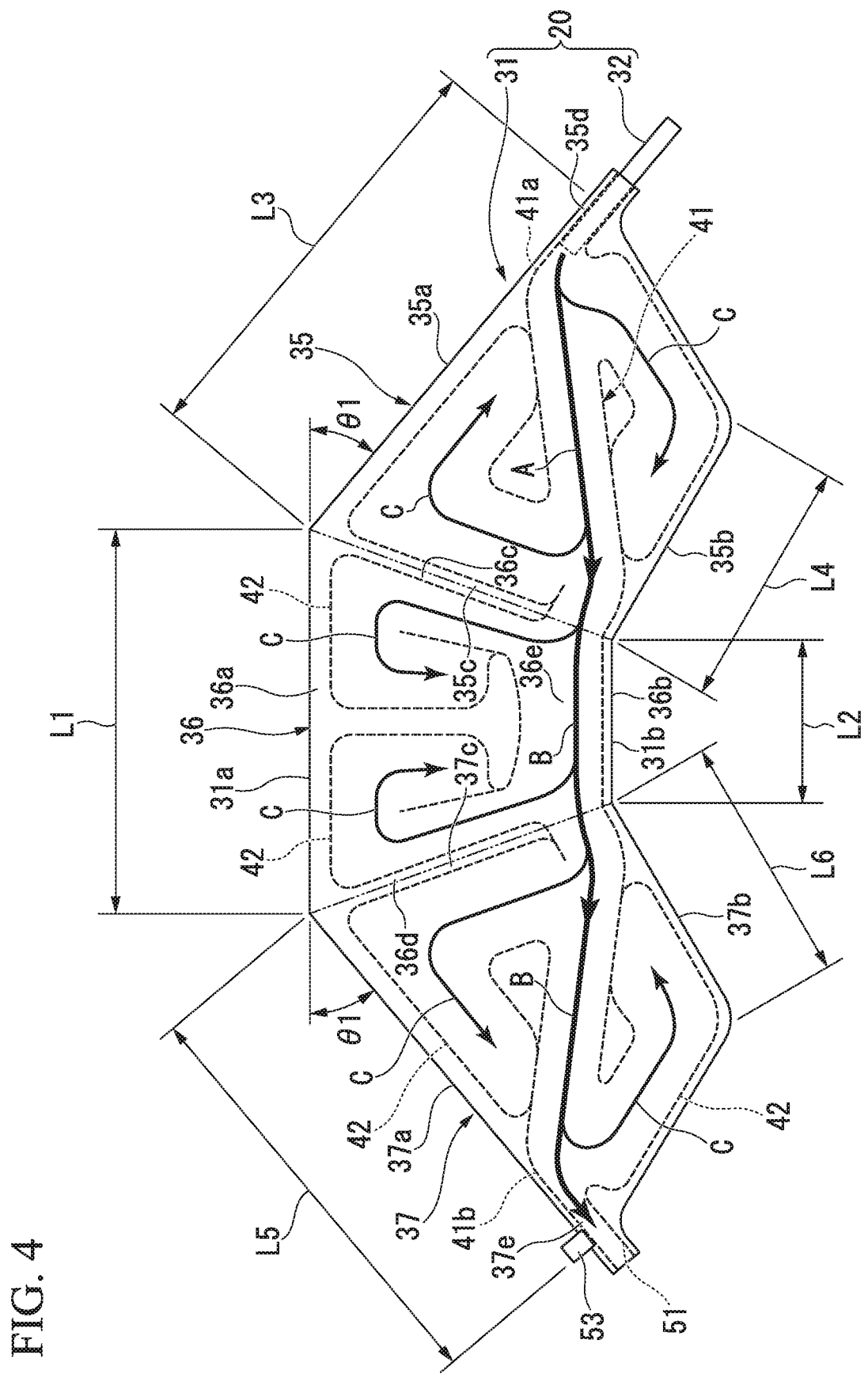
FIG. 4 is a plan view illustrating an example of injecting gas from an inflator to the airbag's bag body according to the first embodiment of the present invention.

As illustrated in FIGS. 2 and 4, if an impact load is input to the vehicle 10, the inflator 32 operates and generates gas. The generated gas flows into the first flow channel 41, as indicated with an arrow A. The gas that has flowed into the first flow channel 41 is guided to the upper rear corner portion 37e of the third bag body through the first flow channel 41, as indicated with an arrow B. Moreover, the gas that has flowed into the first flow channel 41 is guided to the plurality of second flow channels 42, as indicated with an arrow C.

Thus, each of the first bag body 35, the second bag body 36, and the third bag body 37 inflates to be spread in a trapezoidal shape. That is, the second bag body 36 is formed in a trapezoidal shape such that the length dimension L2 of the lower end 36b is smaller than the length dimension L1 of the upper end 36a. In addition, the front end 35c of the first bag body 35 is integrally formed with the right end 36c of the second bag body 36. Thus, the first bag body 35 is disposed in a state in which the lower end (the lower portion) 35b is further attracted to the upper half 22a side of the body of the occupant 22 (that is, the inner side in the vehicle width direction) than the upper end (the upper portion) 35a.

In addition, the front end 37c of the third bag body 37 is integrally formed with the left end 36d of the second bag body 36. Thus, the third bag body 37 is disposed in a state in which the lower end (the lower portion) 37b is further attracted to the upper half 22a side of the body of the occupant 22 (that is, the outer side in the vehicle width direction) than the upper end (the upper portion) 37a.

Moreover, the first bag body 35 is formed in a trapezoidal shape such that the length dimension L4 of the lower end 35b is smaller than the length dimension L3 of the upper end 35a. In addition, in the first bag body 35, the upper end 35a is inclined on a downward gradient at the angle θ1 with respect to the upper end 36a of the second bag body 36.

Similarly, the third bag body 37 is formed in a trapezoidal shape such that the length dimension L6 of the lower end 37b is smaller than the length dimension L5 of the upper end 37a. In the third bag body 37, the upper end 35a is inclined on a downward gradient at the angle θ1 with respect to the upper end 36a of the second bag body 36.

Thus, the second bag body 36 is disposed in a state in which the lower end 36b (the lower portion 36e) is further attracted to the upper half 22a side of the body of the occupant 22 (that is, the rear side of the vehicle body) than the upper end (the upper portion) 36a.

In a state in which the first bag body 35, the second bag body 36, and the third bag body 37 have inflated to be spread, the lower portion of each of the bag bodies 35, 36, and 37 is disposed in a tapered shape being further attracted to the upper half 22a side of the body of the occupant 22 than the upper ends 35a, 36a, and 37a. The lower portion of each of the bag bodies 35, 36, and 37 is a region in the vicinity of the lower end including the lower ends 35b, 36b, and 37b.

In other words, the first bag body 35, the second bag body 36, and the third bag body 37 inflate to be spread in an inclined shape in a manner of approaching the upper half 22a of the body of the occupant 22 toward the lower ends 35b, 36b, and 37b from the upper ends 35a, 36a, and 37a.

Accordingly, the second bag body 36 can restrain the front part of the upper half 22a of the body of the occupant 22. In addition, the first bag body 35 can restrain the part of the upper half 22a of the body of the occupant 22 on the right side. Moreover, the third bag body 37 can restrain the part of the upper half 22a of the body of the occupant 22 on the left side. That is, the upper half 22a of the body of the occupant 22 can be suitably restrained by the first to third bag bodies 35 to 37 in all directions to the front side of the vehicle body, the outer side in the vehicle width direction, and the inner side in the vehicle width direction. As a result, the upper half 22a of the body of the occupant 22 can be appropriately protected in all directions.

Here, the part of the first flow channel 41 on the right side is formed downward to the second bag body 36 from the first bag body 35. In addition, the middle part of the first flow channel 41 extending to the second bag body 36 is formed along the lower portion 36e of the second bag body 36. Moreover, the part of the first flow channel 41 on the left side extending along the lower portion 36e of the second bag body 36 is formed upward to the third bag body 37 from the lower portion 36e of the second bag body 36.

Thus, the first flow channel 41 can be continuously constituted as one gas flow channel to the third bag body 37 from the first bag body 35 through the second bag body 36. That is, one first flow channel 41 can be continuously constituted from the end portion (the upper rear corner portion) 35d of the airbag's bag body 31 on the inflator 32 side to the end portion (the upper rear corner portion) 37e on a side opposite to the inflator 32.

Accordingly, if the continuously constituted first flow channel 41 is filled with gas from the inflator 32, the first flow channel 41 filled with gas can generate a tensile force (reaction force) for attracting the lower ends 35b, 36b, and 37b of the airbag's bag body 31 to the upper half 22a side of the body of the occupant 22. As a result, in all directions including forward in the vehicle body, outward in the vehicle width direction, and inward in the vehicle width direction with respect to the upper half 22a of the body of the occupant 22, the upper half 22a of the body of the occupant 22 can be suitably restrained by the first to third bag bodies 35 to 37 (particularly, the lower portion of each of the bag bodies 35 to 37).

Here, in a spread state of the airbag's bag body 31 caused to inflate to be spread in a plan view, the first flow channel 41 linearly extends to the upper rear corner portion 37e of the third bag body 37 from the upper rear corner portion 35d of the first bag body 35 through the lower end 36b of the second bag body 36.

In addition, the leading end portion 41a of the first flow channel 41 is coupled to the roof rail on the right side (that is, the vehicle body) via the upper rear corner portion 35d of the first bag body 35. In addition, the trailing end portion 41b of the first flow channel 41 is coupled to the vehicle body via the upper rear corner portion 37e of the third bag body 37.

Thus, the first flow channel 41 filled with gas can more appropriately generate a tensile force for attracting the lower ends 35b, 36b, and 37b of the airbag's bag body 31 to the inner side (that is, the upper half 22a side of the body of the occupant 22). Accordingly, the upper half 22a of the body of the occupant 22 can be more suitably restrained by the first bag body 35, the second bag body 36, and the third bag body 37.

In addition, according to the airbag's bag body 31, the upper half 22a of the body of the occupant 22 can be restrained by the airbag's bag body 31 which generates a sufficient reaction force alone without depending on other components such as the instrument panel 12 and the steering wheel 16. Furthermore, the airbag's bag body 31 can restrain the upper half 22a of the body of the occupant 22 alone in all directions including forward in the vehicle body, outward in the vehicle width direction, and inward in the vehicle width direction. Accordingly, the degree of freedom in design of other components such as the instrument panel 12 and the steering wheel 16 can be enhanced.

Next, an airbag apparatus 70 of a second embodiment will be described on the basis of FIGS. 5 to 9. In the second embodiment, the same reference signs are applied to constituent members which are the same as or similar to those of the airbag apparatus 20 of the first embodiment, and description thereof will be omitted.

Second Embodiment

Figure 5:
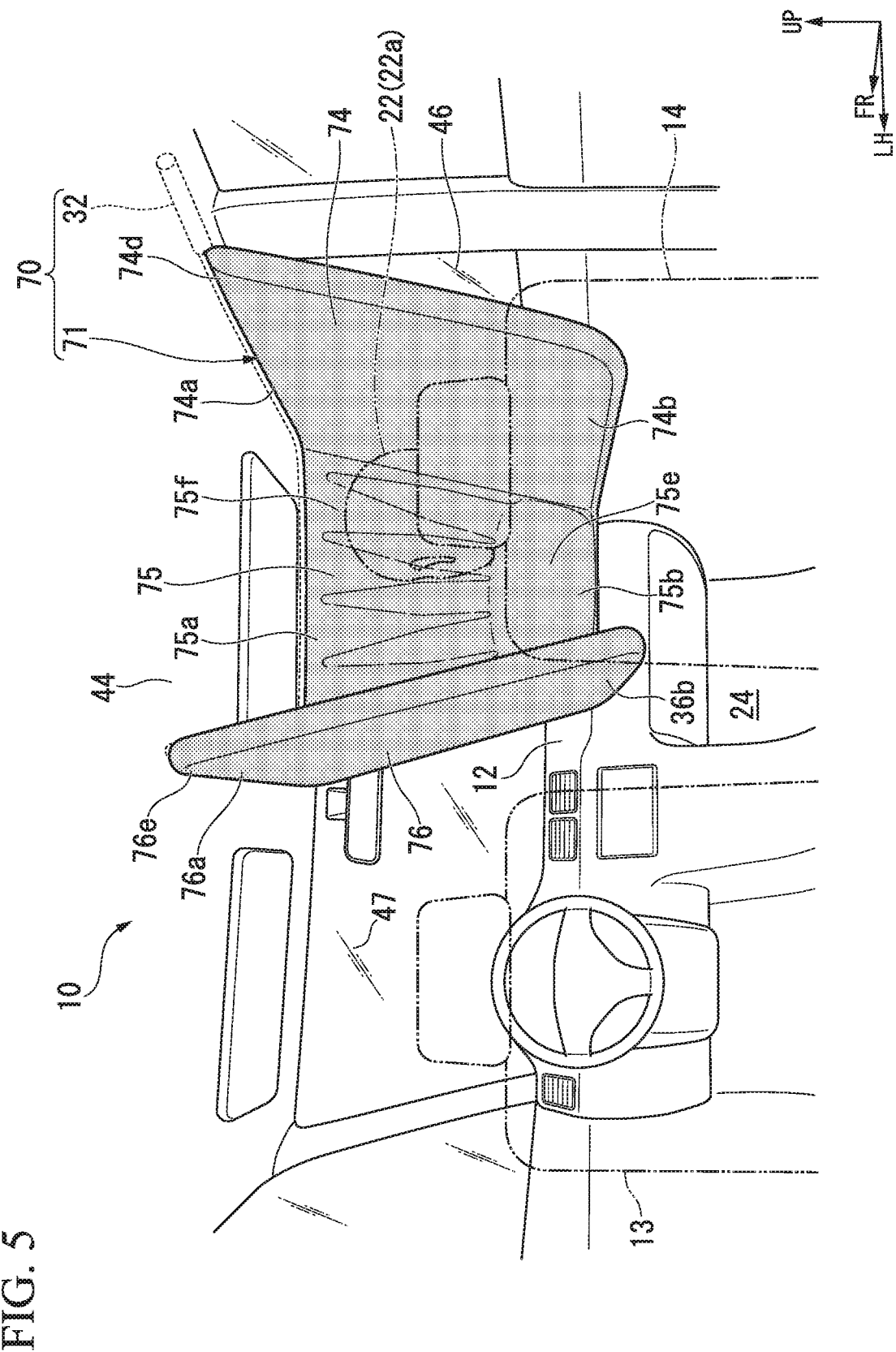
FIG. 5 is a perspective view illustrating a vehicle in which an airbag apparatus according to a second embodiment of the present invention inflates to be spread.

As illustrated in FIG. 5, the airbag apparatus 70 includes an airbag's bag body 71 and the inflator 32. The airbag's bag body 71 includes a first bag body 74, a second bag body 75, a third bag body 76, a first flow channel 81 (refer to FIG. 6), and a plurality of second flow channels 82 (refer to FIG. 6).

Similar to the first to third bag bodies 35 to 37 of the first embodiment, the first bag body 74, the second bag body 75, and the third bag body 76 are folded in an accommodated state and are housed (mounted) above the head lining 44 of the vehicle 10.

Similar to the first to third bag bodies 35 to 37 of the first embodiment, the airbag's bag body 71 is formed in a U-shape in a state in which the first bag body 74, the second bag body 75, and the third bag body 76 are folded in an accommodated state.

In the airbag apparatus 70, when an impact load is input to the vehicle 10, gas is injected into the airbag's bag body 71 from the inflator 32, and the airbag's bag body 71 inflates to be spread. The airbag's bag body 71 inflates to be spread downward in the vehicle interior 24 by tearing the head lining 44 due to the pressure when it inflates, or rolling the head lining 44.

Figure 6:
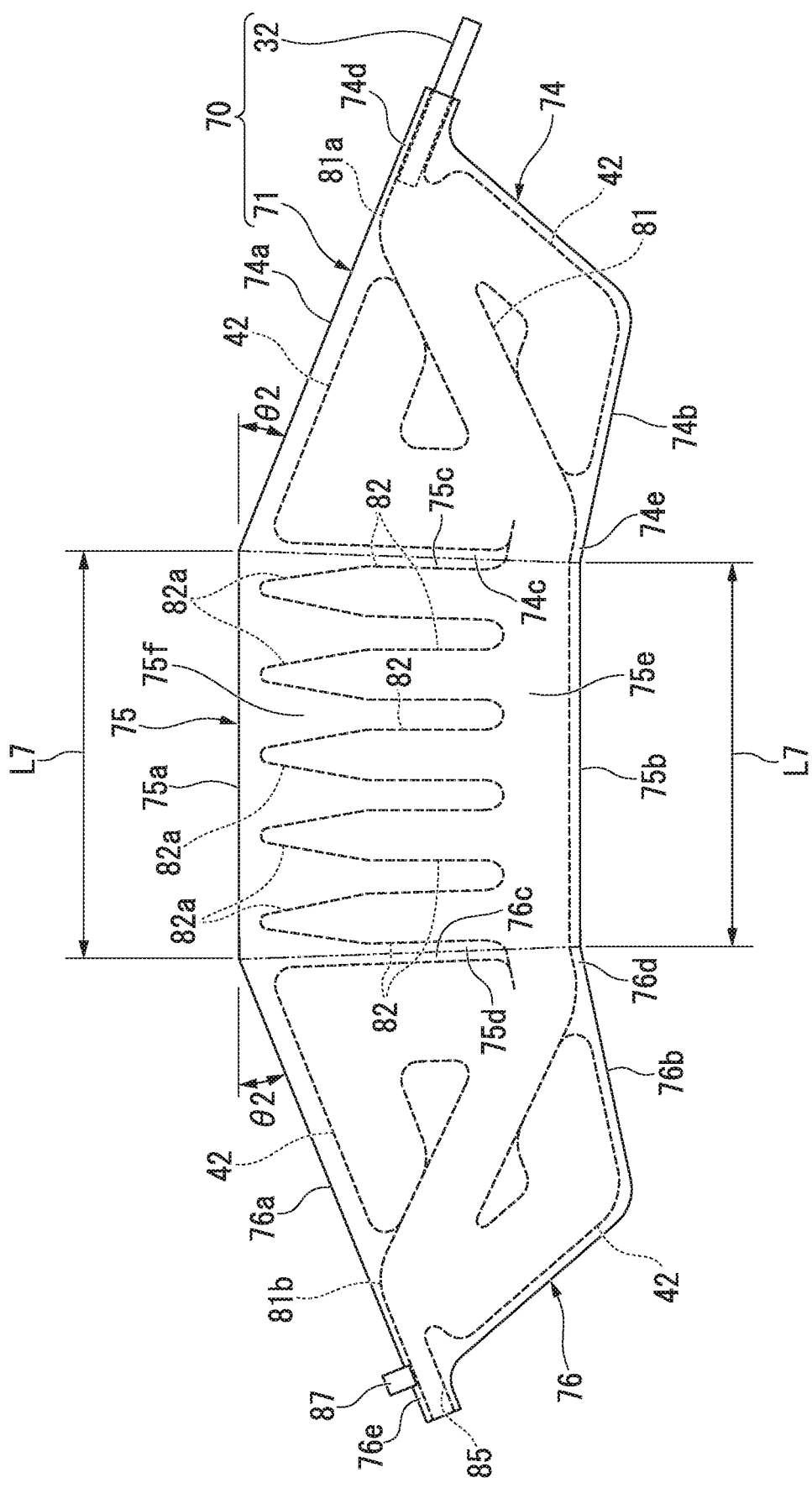
FIG. 6 is a plan view illustrating an airbag's bag body according to the second embodiment of the present invention.

Hereinafter, the configuration of the airbag's bag body 71 will be described in detail on the basis of FIGS. 5 and 6. FIG. 6 illustrates a spread state before the airbag's bag body 71 inflates to be spread in a plan view.

As illustrated in FIGS. 5 and 6, in a state of having inflated to be spread, the second bag body 75 is disposed on the front side of the vehicle body from the upper half 22a of the body of the occupant 22. In a state before the second bag body 75 inflates to be spread, an upper end 75a and a lower end 75b are formed to have the same length dimension L7 in a rectangular shape.

A front end 74c of the first bag body 74 is integrally formed with a right end 75c of the second bag body 75. The first bag body 74 is disposed on the right side of the upper half 22a of the body of the occupant 22 in the vehicle width direction in a state of having inflated to be spread. In a state before the first bag body 74 inflates to be spread, an upper end 74a is inclined on a downward gradient at an angle θ2 with respect to the upper end 75a of the second bag body 75. Similar to the first bag body 35 of the first embodiment, the first bag body 74 is formed in a trapezoidal shape. The upper end 74a of the first bag body 74 is formed to have a length dimension larger than that of a lower end 74b.

The inflator 32 is attached to an upper rear corner portion (an upper end of the first bag body) 74d in the upper end 74a of the first bag body 74. For example, the inflator 32 is attached to the roof rail on the right side (that is, the vehicle body).

A front end 76c of the third bag body 76 is integrally formed with a left end 75d of the second bag body 75. The third bag body 76 is formed to have substantially bilateral symmetry with the first bag body 74. That is, the third bag body 76 is disposed on the left side of the upper half 22a of the body of the occupant 22 in the vehicle width direction in a state of having inflated to be spread. In a state before the third bag body 76 inflates to be spread, an upper end 76a is inclined on a downward gradient at the angle θ2 with respect to the upper end 75a of the second bag body 75. Similar to the third bag body 37 of the first embodiment, the third bag body 76 is formed in a trapezoidal shape. The upper end 76a of the third bag body 76 is formed to have a length dimension larger than that of a lower end 76b.

The airbag's bag body 71 includes the first flow channel (the gas flow channel) 81 and the plurality of second flow channels 82. The first flow channel 81 is formed in each of the bag bodies 74 to 76 in a manner of continuously extending to the third bag body 76 from the first bag body 74 through the second bag body 75.

Specifically, a part of the first flow channel 81 on the right side diagonally extends downward to a lower front corner portion 74e of the first bag body 74 from the upper rear corner portion 74d of the first bag body 74. In other words, a part of the first flow channel 81 on the right side is formed downward to the second bag body 75 from the first bag body 74.

In addition, the middle part of the first flow channel 81 linearly extends to a lower front corner portion 76d of the third bag body 76 from the lower front corner portion 74e of the first bag body 74 along the lower end 75b of the second bag body 75. In other words, the middle part of the first flow channel 81 is formed in a lower portion 75e of the second bag body 75.

Moreover, a part of the first flow channel 81 on the left side diagonally extends upward to an upper rear corner portion 76e of the third bag body 76 from the lower front corner portion 76d of the third bag body 76. In other words, a part of the first flow channel 81 on the left side is formed upward to the third bag body 76 from the lower portion 75e of the second bag body 75.

Here, in a spread state of the airbag's bag body 71 before having inflated to be spread in a plan view, the first flow channel 81 continuously extends to the upper rear corner portion 76e of the third bag body 76 from the upper rear corner portion 74d of the first bag body 74 through the lower end 75b of the second flow channel 82.

The inflator 32 is attached to the upper rear corner portion 74d of the first bag body 74. Thus, the upper rear corner portion 74d of the first bag body 74 is attached to the roof rail on the right side (that is, the vehicle body) via the inflator 32.

In addition, an opening portion 85 of the first flow channel 81 is formed in the upper rear corner portion 76e of the third bag body 76. Moreover, the upper rear corner portion 76e of the third bag body 76 is attached to the vehicle body via an attachment portion 87.

Thus, a leading end portion 81a of the first flow channel 81 is coupled to the roof rail on the right side (that is, the vehicle body) via the upper rear corner portion 74d of the first bag body 74. In addition, a trailing end portion 81b of the first flow channel 81 is coupled to the vehicle body via the upper rear corner portion 76e of the third bag body 76.

In the second bag body 75, the plurality of second flow channels 82 communicate with the first flow channel 81.

The second flow channels 82 are disposed with a space therebetween in a length direction (the vehicle width direction) of the second bag body 75.

In addition, in the first bag body 74, the plurality of second flow channels 82 communicate with the first flow channel 81. Moreover, in the third bag body 76, the plurality of second flow channels 82 communicate with the first flow channel 81. The plurality of second flow channels 82 in the first bag body 74 and the third bag body 76 are similar to the second flow channels 42 of the first embodiment, and detailed description thereof will be omitted.

The second flow channel 82 of the second bag body 75 extends toward an upper portion 75f of the second bag body 75 from the first flow channel 81. In other words, the second flow channel 82 is formed in the upper portion 75f of the second bag body 75.

In addition, the first flow channel 81 is formed to be a flow channel having a cross-sectional area larger than that of the second flow channel 82.

In addition, the second flow channel 82 is formed in a shape having a tapered upper portion 82a in the upper portion 75f of the second bag body 75. Thus, the upper portion 82a of the second flow channel 82 is formed to be a flow channel having a cross-sectional area smaller than other parts of the second flow channel 82.

Next, an example of restraining and protecting the upper half 22a of the body of the occupant 22 by causing the airbag's bag body 71 of the airbag apparatus 70 to inflate to be spread will be described on the basis of FIGS. 5 and 7 to 9.

Figure 7:
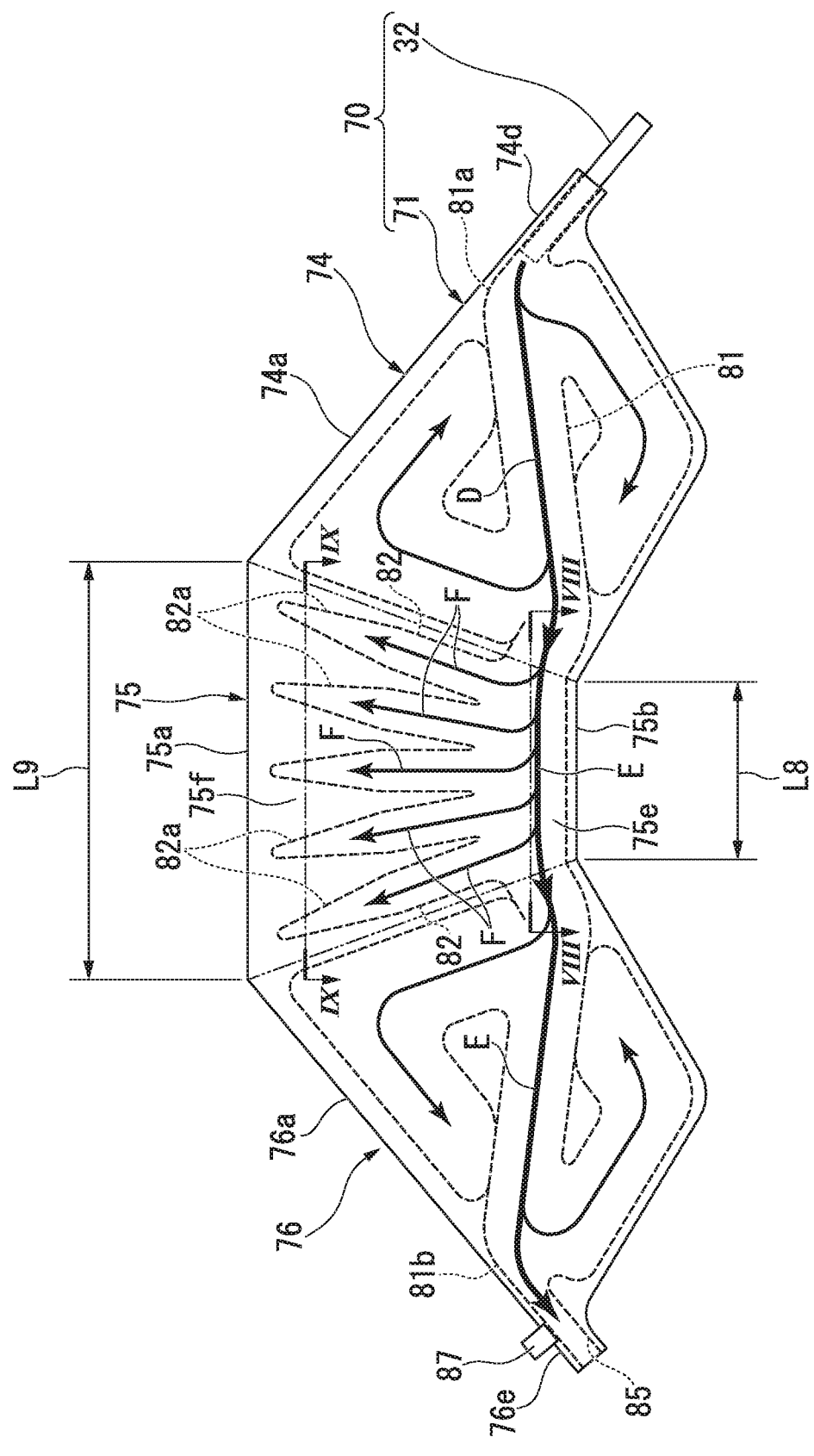
FIG. 7 is a plan view illustrating an example of injecting gas from the inflator to the airbag's bag body according to the second embodiment of the present invention.

As illustrated in FIG. 7, if an impact load is input to the vehicle 10 (refer to FIG. 5), the inflator 32 operates and generates gas. The generated gas flows into the first flow channel 81, as indicated with an arrow D. The gas that has flowed into the first flow channel 81 is guided to the upper rear corner portion 76e of the third bag body through the first flow channel 81, as indicated with an arrow E. Moreover, the gas that has flowed into the first flow channel 81 is guided to the plurality of second flow channels 82, as indicated with an arrow F.

Figure 8:
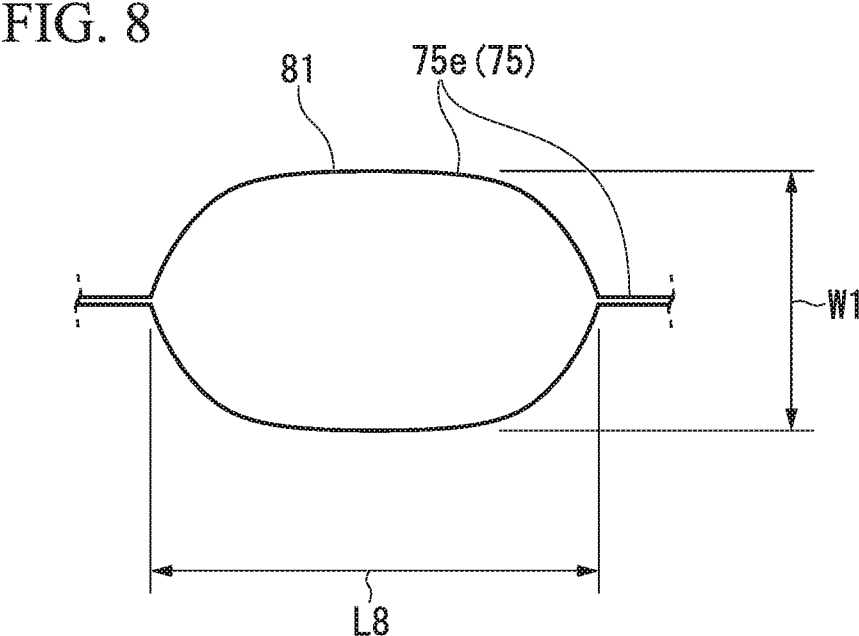
FIG. 8 is a cross-sectional view illustrating a ruptured state of the airbag's bag body according to the second embodiment of the present invention taken along line 11X-11X in FIG. 7.

As illustrated in FIGS. 7 and 8, the first flow channel 81 is formed to be a flow channel having a cross-sectional area larger than that of the second flow channels 82. In addition, the first flow channel 81 is provided in the lower portion 75e of the second bag body 75. Thus, if the first flow channel 81 is filled with gas from the inflator 32, the lower portion 75e of the second bag body 75 significantly inflates in a width direction to have a width dimension W1, due to the inflated first flow channel 81. Accordingly, the lower end 75b of the second bag body 75 is significantly contracted to have a length dimension L8 from the length dimension L7 (refer to FIG. 6).

Figure 9:
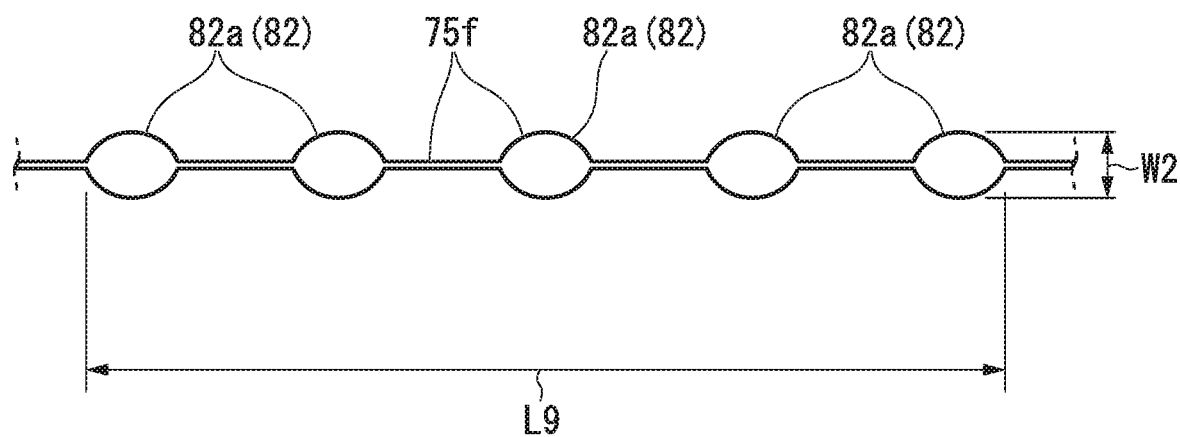
FIG. 9 is a cross-sectional view illustrating a ruptured state of the airbag's bag body according to the second embodiment of the present invention taken along 1X-1X in FIG. 7.

As illustrated in FIGS. 7 and 9, the second flow channel 82 extends toward the upper portion 75f of the second bag body 75. The second flow channel 82 is formed to be a flow channel having a cross-sectional area smaller than that of the first flow channel 81. In addition, the upper portion 82a of the second flow channel 82 is formed in a tapered shape in the upper portion 75f of the second bag body 75. That is, the second flow channel 82 is formed to be a flow channel having a smaller cross-sectional area.

Thus, in a state in which the second flow channel 82 is filled with gas, the upper portion 75f of the second bag body 75 minimally inflates in the width direction to have a width dimension W2, due to the inflated second flow channel 82. In addition, the second flow channels 82 are disposed with a space therebetween in the length direction of the second bag body 75. Accordingly, the upper end 75a of the second bag body 75 is minimally contracted to have a length dimension L9 (refer to FIG. 6) from the length dimension L7.

As illustrated in FIGS. 5 and 7, the first flow channel 81 continuously extends to the upper rear corner portion 76e of the third bag body 76 from the upper rear corner portion 74d of the first bag body 74 through the lower end 75b of the second flow channel 82. Thus, if the first flow channel 81 is filled with gas from the inflator 32, the airbag's bag body 71 can generate a tensile force (reaction force) for restraining the upper half 22a of the body of the occupant 22.

In addition, the lower portion 75e of the second bag body 75 is more significantly contracted in the length direction than the upper portion 75f of the second bag body 75. Moreover, in the first bag body 74, the upper end 74a is inclined on a downward gradient at the angle θ2 with respect to the upper end 75a of the second bag body 75 (refer to FIG. 6). Moreover, in the third bag body 76, the upper end 76a is inclined on a downward gradient at the angle θ2 with respect to the upper end 75a of the second bag body 75 (refer to FIG. 6).

Thus, in a state in which the first to third bag bodies 74 to 76 inflate to be spread such that the front side and both sides of the upper half 22a of the body of the occupant 22 are surrounded, the lower end (the lower portion) 74b of the first bag body 74 can be further attracted to the right side of the upper half 22a of the body of the occupant 22 than the upper end (the upper portion) 74a.

In addition, the lower portion 75e of the second bag body 75 can be further attracted to the front side of the upper half 22a of the body of the occupant 22 than the upper portion 75f. Moreover, the lower end (the lower portion) 76b of the third bag body 76 can be further attracted to the left side of the upper half 22a of the body of the occupant 22 than the upper end (the upper portion) 76a.

That is, the first bag body 74, the second bag body 75, and the third bag body 76 can be caused to inflate to be spread in an inclined shape in a manner of approaching the upper half 22a of the body of the occupant 22 from the upper portion toward the lower portion.

Accordingly, the upper half 22a of the body of the occupant 22 can be suitably restrained by each of the bag bodies 74 to 76 (particularly, the lower portion of each of the bag bodies 74 to 76) in all directions including forward in the vehicle body, outward in the vehicle width direction, and inward in the vehicle width direction with respect to the upper half 22a of the body of the occupant 22. As a result, the upper half 22a of the body of the occupant 22 can be appropriately protected in all directions.

In addition, according to the airbag's bag body 71, the upper half 22a of the body of the occupant 22 can be restrained by the airbag's bag body 71 which generates a sufficient reaction force alone without depending on other components such as the instrument panel 12 and the steering wheel 16. Furthermore, the airbag's bag body 71 can restrain the upper half 22a of the body of the occupant 22 alone in all directions including forward in the vehicle body, outward in the vehicle width direction, and inward in the vehicle width direction. Accordingly, the degree of freedom in design of other components such as the instrument panel 12 and the steering wheel 16 can be enhanced.

Modification Example

In the first embodiment and the second embodiment, examples, in which the opening portion 51 is formed in the trailing end portion (the end portion) 41b of the first flow channel 41 and the opening portion 85 is formed in the trailing end portion (the end portion) 81b of the first flow channel 81, have been described. However, the embodiments are not limited thereto. As an alternative example, for example, the opening portion 51 or the opening portion 85 may have a closed structure by stitching (suturing) the trailing end portions 41b and 81b to be blocked.

In this manner, if the trailing end portions 41b and 81b of the first flow channels 41 and 81 formed in the third bag bodies 37 and 76 have a closed structure, gas supplied from the inflator 32 can be prevented from being discharged out of the airbag's bag bodies 31 and 71. Thus, the supplying amount of gas supplied from the inflator 32 to the insides of the airbag's bag bodies 31 and 71 can be minimized.

Accordingly, the shape of the inflator 32 is minimized, and reduction in costs and weight reduction in the airbag apparatuses 20 and 70 can be realized.

The technical scope of the present invention is not limited to the embodiments described above, and various changes can be applied within a range not departing from the gist of the present invention.

For example, according to the first embodiment and the second embodiment described above, as airbag apparatuses 20 and 70, the airbag apparatuses 20 and 70 which restrain and protect an occupant sitting on the passenger seat 14 have been described as representative examples. However, the embodiments are not limited thereto. As an alternative example, for example, the present invention can also be applied to a driver sitting on the driver's seat 13, or an occupant sitting on a rear seat.

In addition, according to the first embodiment and the second embodiment described above, examples, in which the first bag bodies 35 and 74, the second bag bodies 36 and 75, and the third bag bodies 37 and 76 respectively inflate to be spread on the right side, the front side, and the left side of the upper half 22a of the body of the occupant 22, have been described. However, the embodiments are not limited thereto. As an alternative example, for example, in a case of a vehicle in which the occupant 22 sits while having the upper half 22a of the body facing the rear side of the vehicle body, the right side of the vehicle body, or the left side of the vehicle body, the first bag body, the second bag body, and the third bag body can also be configured to inflate to be spread to cope with the direction of the upper half 22a of the body of the occupant 22.

In addition, according to the second embodiment, an example, in which the second flow channels 82 are extended from the first flow channel 81 toward the upper portion 75*f* of the second bag body 75, has been described. However, the embodiment is not limited thereto. As an alternative example, the second flow channels 82 may be formed in the upper portion 75*f* of the second bag body 75 independently from the first flow channel 81. In this case, an inflator for supplying gas to the first flow channel 81 and an inflator for supplying gas to the second flow channels 82 are separately provided. Accordingly, the states of supplying gas to the first flow channel 81 and the second flow channels 82 can be separately controlled, so that the state of the airbag's bag body 71 which inflates to be spread can be more suitably adjusted.

What is claimed is:

1. An airbag apparatus comprising:
    an airbag's bag body that inflates to be spread such that a front side and both sides of an occupant are surrounded,
    wherein the airbag's bag body includes a first bag body, a second bag body, and a third bag body which are integrally formed,
    wherein in a state in which the first bag body, the second bag body, and the third bag body have inflated to be spread, lower portions of the first bag body and the second bag body are disposed to be further attracted to the occupant side than upper portions thereof, and
    wherein in a state in which the second bag body have inflated to be spread, the second bag body is formed such that the length of a lower end of the second bag body is smaller than the length of an upper end thereof.

2. The airbag apparatus according to claim 1,
    wherein in the airbag's bag body, in the state in which the first bag body, the second bag body, and the third bag body have inflated to be spread, a top side on which upper ends of the bag bodies are connected to each other is formed to have a length dimension larger than a length dimension of a bottom side on which lower ends of the bag bodies are connected to each other.

3. The airbag apparatus according to claim 1, further comprising:
    an inflator that injects gas into the first bag body, the second bag body, and the third bag body; and
    a gas flow channel that is formed to communicate to the third bag body from the first bag body through the second bag body,
    wherein the inflator is attached to the upper end of the first bag body, and
    wherein the gas flow channel is formed downward to the second bag body from the upper portion of the first bag body, is formed in the lower portion of the second bag body, and is formed upward to the third bag body from the lower portion of the second bag body.

4. The airbag apparatus according to claim 1, further comprising:
    a first gas flow channel that is formed in the lower portion of the second bag body; and
    a second gas flow channel that is formed in the upper portion of the second bag body,
    wherein the first flow channel is formed to be a flow channel having a cross-sectional area larger than a cross-sectional area of the second flow channel.

5. The airbag apparatus according to claim 4,
    wherein the upper portion of the second flow channel has a tapered shape.

6. The airbag apparatus according to claim 1,
    wherein an end portion of the gas flow channel formed in the third bag body has a closed structure.

7. The airbag apparatus according to claim 4,
    wherein the first gas flow channel is formed along a vehicle width direction, and the second gas flow channel is formed to communicate with the first gas flow channel and extend upward in the second bag body.

* * * * *